United States Patent [19]
Bauman et al.

[11] Patent Number: 5,347,266
[45] Date of Patent: Sep. 13, 1994

[54] METHOD AND DEVICE FOR ACCESSING SHARED CHARACTER PATTERNS, AND RESULTING STORED DECOMPRESSIBLE FONT STRUCTURE

[75] Inventors: Joseph H. Bauman; Claude W. Nichols, III, both of Vancouver, Wash.

[73] Assignee: Hewlett-Packard Company, Palo Alto, Calif.

[21] Appl. No.: 824,743

[22] Filed: Jan. 16, 1992

Related U.S. Application Data

[63] Continuation of Ser. No. 493,056, Mar. 13, 1990, abandoned.

[51] Int. Cl.$^5$ ............................................. G09G 5/22
[52] U.S. Cl. ...................................... 340/735; 382/56; 395/110
[58] Field of Search ............... 340/735, 790, 744, 745, 340/748; 382/56; 395/110, 150, 151; 400/61, 70, 76, 121

[56] References Cited

U.S. PATENT DOCUMENTS

| | | | |
|---|---|---|---|
| 4,047,248 | 9/1977 | Lyman et al. | 395/150 |
| 4,131,883 | 12/1978 | Lundstrom | 395/151 |
| 4,353,653 | 10/1982 | Zimmerman | 400/70 |
| 4,429,306 | 1/1984 | Macauley et al. | 340/735 |
| 4,481,602 | 11/1984 | Bohrer et al. | |
| 4,686,525 | 8/1987 | Nagata | 340/790 |
| 4,704,040 | 11/1987 | Takano et al. | 340/748 |
| 4,735,515 | 4/1988 | Ueda et al. | 340/745 |
| 4,740,783 | 4/1988 | Lawrence | 340/735 |
| 4,749,989 | 6/1988 | Carosso | 340/735 |
| 4,881,069 | 11/1989 | Kameda et al. | 340/735 |
| 4,918,429 | 4/1990 | Clarke | 340/790 |
| 5,108,208 | 4/1992 | Gardner | 340/735 |

FOREIGN PATENT DOCUMENTS

| | | | |
|---|---|---|---|
| 0297058 | 12/1988 | Japan | 395/110 |
| 0100093 | 4/1990 | Japan | |

OTHER PUBLICATIONS

"Compression/Decompression of Font Patterns", IBM Technical Disclosure Bulletin, vol. 28, No. 8 Jan. 1986, pp. 3563–3564.

*Primary Examiner*—Jeffery Brier

[57] ABSTRACT

The invented method, device and resulting font structure recognize that different fonts may have shared characters or common bit patterns. For example, if the character "—" is the same in two different fonts, it only needs to be stored in memory once. It can then be referenced by both fonts. Specifically, the invention identifies shared characters or bit patterns, stores one of the shared characters or patterns at one location, and references that location in all fonts needing the character or pattern.

8 Claims, 9 Drawing Sheets

| Address (Hex) | Contents (Hex) | Description |
|---|---|---|
| | | BLACK WIDTH TABLE |
| 0000 | 07 | "]" |
| 0001 | 07 | "i" |
| 0002 | 18 | "_" |
| | | FLAG BYTE POINTER TABLE (Strip 3) |
| 0003 | 0000 | Null Alternate Strip Chain Pointer |
| 0005 | 0021 | "]" |
| 0007 | 002A | "i" |
| 0009 | 0031 | " " |
| 000B | 0049 | Pointer to the "virtual" character after "_" |
| | | FLAG BYTE POINTER TABLE (Strip 2) |
| 000D | 0000 | Null Alternate Strip Chain Pointer |
| 000F | 0049 | "]" |
| 0011 | 0058 | "i" |
| 0013 | 0068 | " " |
| 0015 | 0080 | Pointer to the "virtual" character after "_" |
| | | FLAG BYTE POINTER TABLE (Strip 1) |
| 0017 | 0000 | Null Alternate Strip Chain Pointer |
| 0019 | 0080 | "]" |
| 001B | 0087 | "i" |
| 001D | 008E | " " |
| 001F | 00BE | Pointer to the "virtual" character after "_" |
| | | FLAG BYTES and DOT DATA (Strip 3) "]" |
| 0021 | 00,00,01,01,00, 00,00 | Flag Bytes |
| 0028 | 80,FF | Dot Data |
| | | "i" |
| 002A | 00,00,00,00,00, 00,00 | Flag Bytes |
| | | " " |
| 0031 | 00,00,00,00,00, 00,00,00,00,00, 00,00,00,00,00, 00,00,00,00,00, 00,00,00,00 | Flag Bytes |
| | | FLAG BYTES and DOT DATA (Strip 2) "]" |
| 0049 | 01,01,01,03,01, 01,01 | Flag Bytes |
| 0050 | 01,01,01,FF,FF, 01,01,01 | Dot Data |
| | | "i" |
| 0058 | 01,01,03,03,01, 01,01 | Flag Bytes |
| 005F | 01,01,10,01,9F, FF,01,01,01 | Dot Data |
| | | " " |
| 0068 | 00,00,00,00,00, 00,00,00,00,00, 00,00,00,00,00, 00,00,00,00,00, 00,00,00,00 | Flag Bytes |
| | | FLAG BYTES and DOT DATA (Strip 1) "]" |
| 0080 | 00,00,00,00,00, 00,00 | Flag Bytes |
| | | "i" |
| 0087 | 00,00,00,00,00, 00,00 | Flag Bytes |
| | | " " |
| 008E | 02,02,02,02,02, 02,02,02,02,02, 02,02,02,02,02, 02,02,02,02,02, 02,02,02,02 | Flag Bytes |
| 00A6 | 20,20,20,20,20, 20,20,20,20,20, 20,20,20,20,20, 20,20,20,20,20, 20,20,20,20 | Dot Data |
| 00BE | | Next address |

FIG. 5

```
                                        Strip 3
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0011000 0000000 000000000000000000000000        0000000011 00000000 000000000000000000000000
0001000 0000000 000000000000000000000000        0000000001 00000000 000000000000000000000000
0001000 0000000 000000000000000000000000        0000000010 00000000 000000000000000000000000
0001000 0000000 000000000000000000000000        0000000010 00000000 000000000000000000000000
0001000 0000000 000000000000000000000000        0000000010 00000000 000000000000000000000000
0001000 0000000 000000000000000000000000        0000000010 00000000 000000000000000000000000
0001000 0000000 000000000000000000000000        0000000100 00000000 000000000000000000000000
0001000 0000000 000000000000000000000000        0000000100 00000000 000000000000000000000000
                                        Strip 2
0001000 0001000 000000000000000000000000        0000000100 00000001 000000000000000000000000
0001000 0000000 000000000000000000000000        0000000100 00000000 000000000000000000000000
0001000 0000000 000000000000000000000000        0000001000 00000000 000000000000000000000000
0001000 0011000 000000000000000000000000        0000001000 00000110 000000000000000000000000
0001000 0001000 000000000000000000000000        0000001000 00000010 000000000000000000000000
0001000 0001000 000000000000000000000000        0000010000 00000100 000000000000000000000000
0001000 0001000 000000000000000000000000        0000010000 00000100 000000000000000000000000
0001000 0001000 000000000000000000000000        0000010000 00000100 000000000000000000000000
0001000 0001000 000000000000000000000000        0000010000 00000100 000000000000000000000000
0001000 0001000 000000000000000000000000        0000100000 00001000 000000000000000000000000
0001000 0001000 000000000000000000000000        0000100000 00001000 000000000000000000000000
0001000 0001000 000000000000000000000000        0000100000 00001000 000000000000000000000000
0001000 0001000 000000000000000000000000        0000100000 00001000 000000000000000000000000
0001000 0001000 000000000000000000000000        0001000000 00010000 000000000000000000000000
1111111 1111111 000000000000000000000000        1111111000 11111110 000000000000000000000000
                                        Strip 1
0000000 0000000 000000000000000000000000        0000000000 00000000 000000000000000000000000
0000000 0000000 000000000000000000000000        0000000000 00000000 000000000000000000000000
0000000 0000000 111111111111111111111111        0000000000 00000000 111111111111111111111111
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
0000000 0000000 000000000000000000000000        0000000000 00000000 000000000000000000000000
         40↗                                              42↗
                        FIG. 6
```

FIG. 7

```
Address  Contents              Description
(Hex)    (Hex)
-----------------------------------------------------------------------
                               BLACK WIDTH TABLE
1000     0A                         "]"
1001     08                         "i"
1002     18                         " "

FLAG BYTE POINTER TABLE (Strip 3)
1003     0005                      Alternate Strip Chain Pointer
1005     1021                         "]"
1007     102E                         "i"
1009     1036                         " "
100B     1036                       Pointer to the "virtual" character after "_"
                               FLAG BYTE POINTER TABLE (Strip 2)
100D     000F                      Alternate Strip Chain Pointer
100F     1036                         "]"
1011     104A                         "i"
1013     105C                         " "
1015     105C                       Pointer to the "virtual" character after "_"
                               FLAG BYTE POINTER TABLE (Strip 1)
1017     0019                      Alternate Strip Chain Pointer
1019     105C                         "]"
101B     1066                         "i"
101D     106E                         " "
101F     106E                       Pointer to the "virtual" character after "_"
                               FLAG BYTES and DOT DATA (Strip 3)
                                         "]"
1021     00,00,00,00,00,             Flag Bytes
         00,00,01,01,01
102B     03,BC,C0                    Dot Data
                                         "i"
102E     00,00,00,00,00,             Flag Bytes
         00,00,00
                                         " "
1036                                NO Flag Bytes
                               FLAG BYTES and DOT DATA (Strip 2)
                                         "]"
1036     01,01,01,01,01,             Flag Bytes
         03,03,02,00,00
1040     01,01,01,03,3D,             Dot Data
         03,C1,3C,01,C0
                                         "i"
104A     01,01,01,01,01,             Flag Bytes
         03,03,02
1052     01,01,01,03,3D,             Dot Data
         13,C1,1C,01,80
                                         " "
105C                                 Flag Bytes
                               FLAG BYTES and DOT DATA (Strip 1)
                                         "]"
105C     00,00,00,00,00,             Flag Bytes
         00,00,00,00,00
                                         "i"
1066     00,00,00,00,00,             Flag Bytes
         00,00,00
                                         " "
106E                                NO Flag Bytes
106E                               Next address
```

FIG. 8

```
                                    Strip 3 Flag Bytes
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0011000 0000000 000000000000000000000000  0000000111 00000000 ------------------------
                                    Strip 1 Dot Data
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
--11---  -------  ------------------------   -------011  --------  ------------------------
--01---  -------  ------------------------   -------001  --------  ------------------------
--01---  -------  ------------------------   -------010  --------  ------------------------
--01---  -------  ------------------------   -------010  --------  ------------------------
--01---  -------  ------------------------   -------010  --------  ------------------------
--01---  -------  ------------------------   -------010  --------  ------------------------
--01---  -------  ------------------------   -------100  --------  ------------------------
--01---  -------  ------------------------   -------100  --------  ------------------------
                                    Strip 3 Flag Bytes
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0001000 0001000 000000000000000000000000  0000011100 00000111 ------------------------
1111111 1111111 000000000000000000000000  1111111000 11111110 ------------------------
                                    Strip 1 Dot Data
---1---  --01---  ------------------------   -----001--  -----001  ------------------------
---1---  --00---  ------------------------   -----001--  -----000  ------------------------
---1---  --00---  ------------------------   -----010--  -----000  ------------------------
---1---  --11---  ------------------------   -----010--  -----110  ------------------------
---1---  --01---  ------------------------   -----010--  -----010  ------------------------
---1---  --01---  ------------------------   -----010--  -----010  ------------------------
---1---  --01---  ------------------------   -----100--  -----100  ------------------------
---1---  --01---  ------------------------   -----100--  -----100  ------------------------
0001000 0001000 ------------------------  0000010--- 0000010- ------------------------
0001000 0001000 ------------------------  0000010--- 0000010- ------------------------
0001000 0001000 ------------------------  0000100--- 0000100- ------------------------
0001000 0001000 ------------------------  0000100--- 0000100- ------------------------
0001000 0001000 ------------------------  0000100--- 0000100- ------------------------
0001000 0001000 ------------------------  0000100--- 0000100- ------------------------
0001000 0001000 ------------------------  0001000--- 0001000- ------------------------
1111111 1111111 ------------------------  1111111--- 1111111- ------------------------
                                    Strip 3 Flag Bytes
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 000000000000000000000000  0000000000 00000000 ------------------------
0000000 0000000 111111111111111111111111  0000000000 00000000 ------------------------
0000000 0000000 000000000000000000000000  0000000000 00000000 ------------------------
                                    Strip 1 Dot Data
-------  -------  000000000000000000000000  ----------  --------  ------------------------
-------  -------  000000000000000000000000  ----------  --------  ------------------------
-------  -------  111111111111111111111111  ----------  --------  ------------------------
-------  -------  000000000000000000000000  ----------  --------  ------------------------
-------  -------  000000000000000000000000  ----------  --------  ------------------------
-------  -------  000000000000000000000000  ----------  --------  ------------------------
-------  -------  000000000000000000000000  ----------  --------  ------------------------
-------  -------  000000000000000000000000  ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
-------  -------  ------------------------   ----------  --------  ------------------------
```

FIG. 9

METHOD AND DEVICE FOR ACCESSING SHARED CHARACTER PATTERNS, AND RESULTING STORED DECOMPRESSIBLE FONT STRUCTURE

This application is a continuation of application Ser. No. 07/493,056, filed Mar. 13, 1990, to be abandoned.

TECHNICAL FIELD

This invention relates to data compression. More particularly, this invention relates to a method of compressing font data by accessing shared character patterns, to a device employing the method, and to a resulting stored, decompressible font structure.

BACKGROUND ART

A font is a family of characters of a given style, typically used in printing. A font character is one symbol in the font.

In computer printing systems, fonts are often stored in a printer's memory and accessed by commands from a host computer. The more characters in the font, the more memory that is needed.

Often users desire to print with more than one font. For example, a user may wish to italicize a word, or to use smaller letters. The italicized and small characters would constitute different fonts. Courier 12-point is a particular font. The word "point" refers to a unit of type measurement equal to 1/72-of-an-inch, so "12-point" refers to characters that are 1/6-of-an-inch tall. Courier 12-point italic and Courier 10-point are both different fonts, one having italicized characters and the other having smaller characters.

Additional memory is needed to store additional fonts in a printer, such as italicized fonts and small character fonts. But memory is expensive, so printers with multiple fonts are also expensive.

The invention allows for compression of more fonts into a fixed-size memory. Thus, multiple fonts may be used with a smaller memory.

DISCLOSURE OF THE INVENTION

The invented method, device and resulting font structure recognize that different fonts may have shared characters or common bit patterns. For example, if the character "_" is the same in two different fonts, it only needs to be stored in memory once. It can then be referenced by both fonts. Specifically, the invention identifies shared characters or bit patterns, stores one of the shared characters or patterns at one location, and references that location in all fonts needing the character or pattern.

BRIEF DESCRIPTION OF THE DRAWINGS

FIG. 5 is a font storage listing and structure for the upright font of FIG. 1.

FIG. 6 shows dot patterns, similar to those of FIGS. 1 and 2, that have been compressed by defining character widths.

FIG. 7 shows dot patterns, similar to FIG. 6, that have been further compressed by using flag bytes to represent blank bits.

FIG. 8 is a font storage listing and structure for the italicized font of FIG. 2.

FIG. 9 shows dot patterns, similar to FIG. 7, that have been still further compressed by using alternate strip chain pointers.

DETAILED DESCRIPTION AND BEST MODE FOR CARRYING OUT THE INVENTION

To store fonts in memory, characters are digitized into dots, and placed on a matrix at a given resolution. A dot is simply part of a character.

Figure 1:
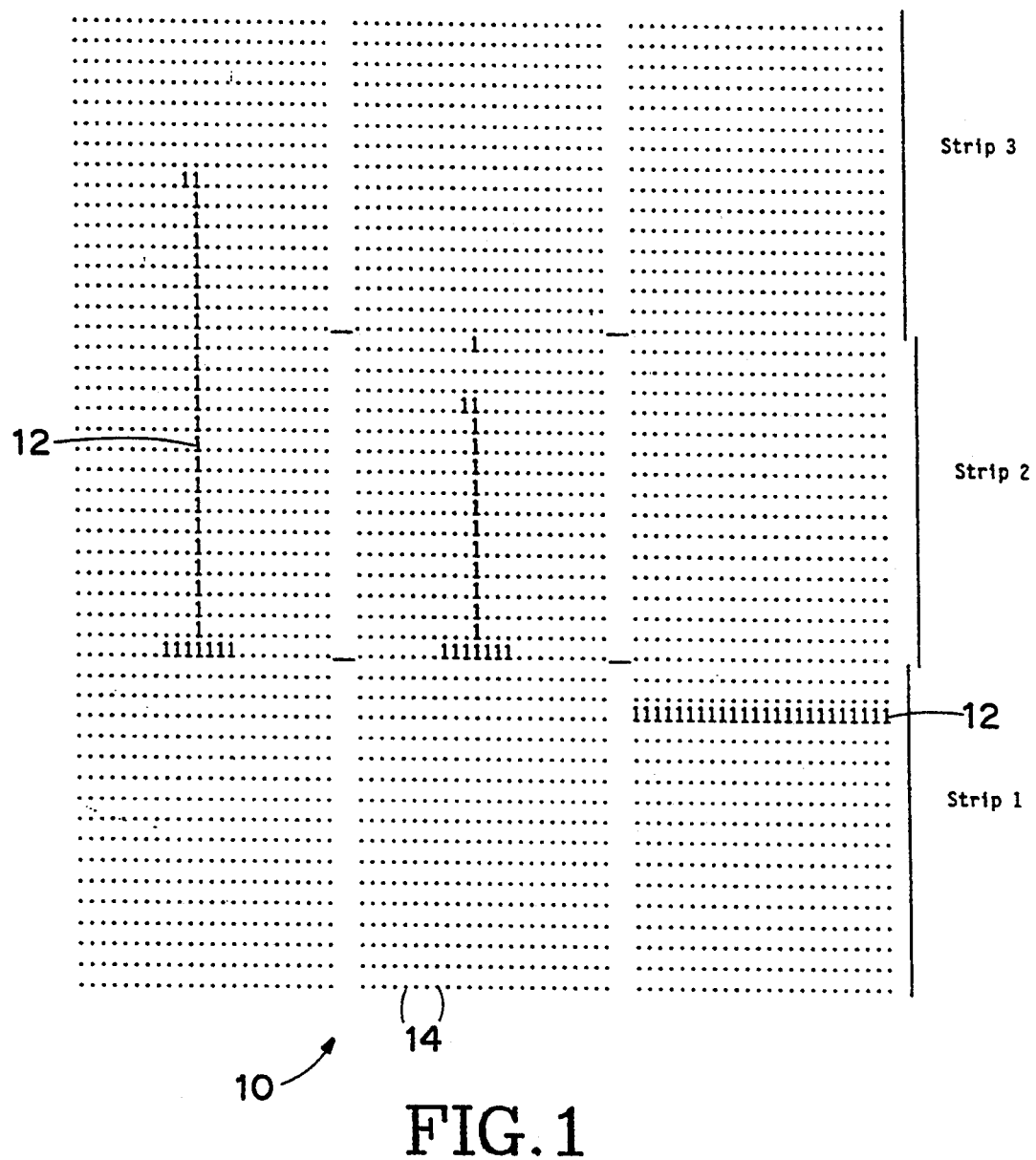
FIG. 1 shows dot patterns of a font composed of three upright characters: "1", "i", and "_".

FIG. 1 shows generally at 10 the dot pattern of a font composed of three characters, "1", "i" and "_". Pattern 10 has been drawn as it would exist for a scanning printhead ink jet printer. An ink jet printer prints by shooting drops of ink onto a page. In FIG. 1, the three characters are made from an arrangement of "1s", such as those identified at 12. The "1s" represent dots of ink.

Surrounding the characters are numerous points, such as points 14. They represent spaces that are blank, but that could be occupied by an ink drop.

The characters of FIG. 1 are depicted in a bit image format. In other words, pattern 10 may be stored in the memory of a printer in such a way that each available space for a drop of ink may be represented by a bit of information. A bit, or binary digit, is the basic unit of information in a computer, and may be either "1" or "0". If the bit is 1, it may be thought of as "on", and an ink drop will be printed in the corresponding location. If the bit is 0, it is "off" and no ink drop will be printed. "1s", such as those identified at 12, may also be thought of as bits that are on. Points, such as points 14, may also be thought of as bits that are off. Thus, the dot patterns of FIG. 1 may also be referred to as bit patterns.

Scanning ink jet printers have printheads with limited vertical dimensions. For example, if a printhead is 1/6-of-an-inch high, it can only print characters or parts of characters that are 1/6-of-an-inch high or less in a single pass of the printhead.

This often results in two-pass characters, or characters that can only be printed in two passes of a printhead. To illustrate this, FIG. 1 has been divided into three strips, strip 1, strip 2 and strip 3. Each strip is a horizontal row of character data. In FIG. 1, each strip is 16-bits high, or 2-bytes high, where a byte is eight bits. In other words, each strip may contain a number of 2-byte columns of information. The vertical height of the strips represent the vertical height of a given printhead, so each strip would be printed in a different pass of the printhead.

The character "1" in FIG. 1 is 24-bits high, and therefore, is a 2-pass or 2-strip character. The remaining characters, "i" and "_", are single pass or single strip characters. Additionally, the characters of FIG. 1 have been defined so that they may have a maximum horizontal dimension, or width, of 24-bits.

Figure 2:
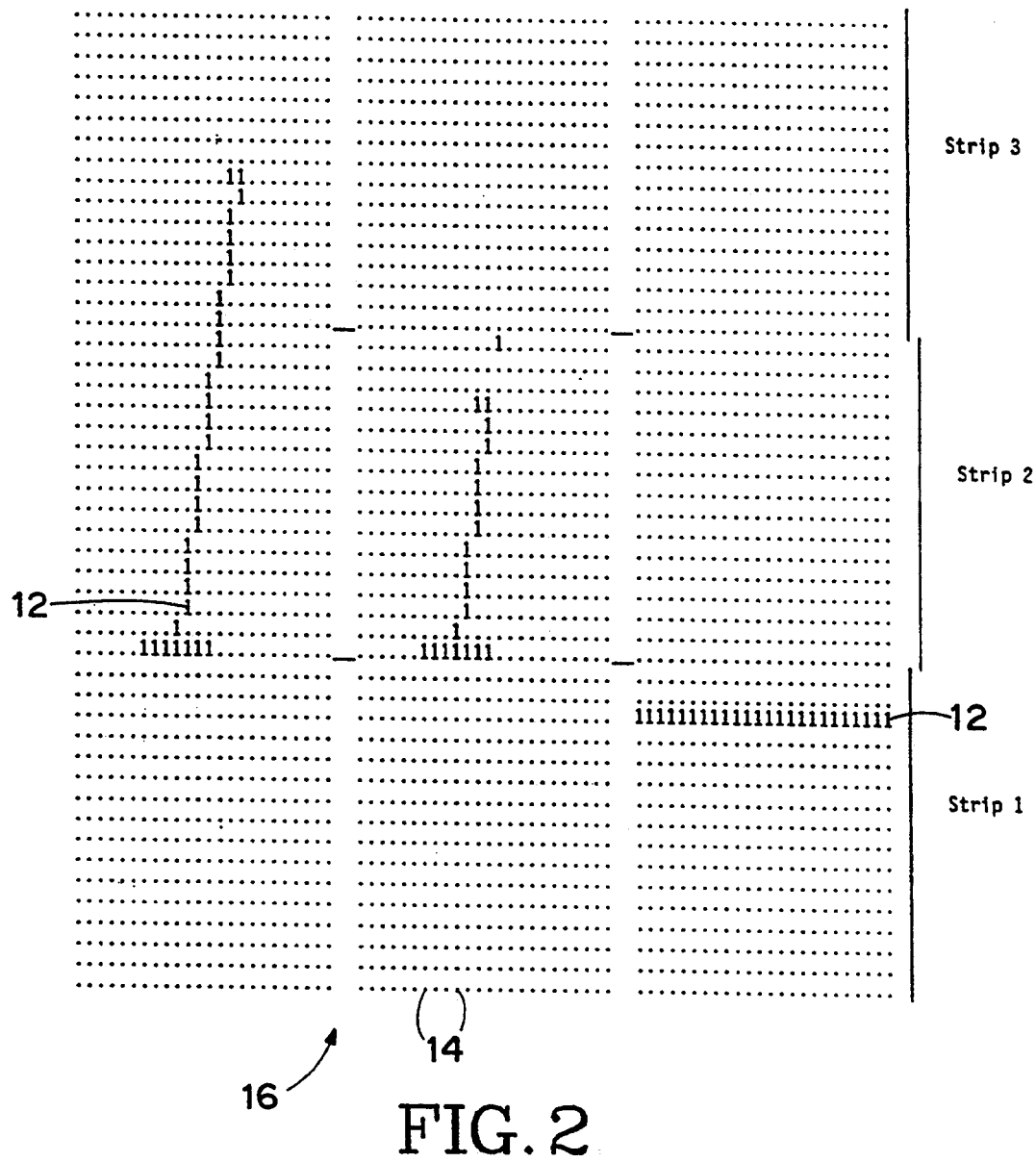
FIG. 2 shows the dot patterns of a second font composed of the three italicized characters: "1", "i", and "_".

FIG. 2 is similar to FIG. 1, except that it is a different font having three italicized characters, "l", "i", and "_", shown generally at 16. Again, the "1s" represent dots or bits that are on, and the points represent blank spaces or bits that are off. The memory required to store the raw data depicted in FIGS. 1 and 2 may be calculated as follows:

$$\begin{aligned} \text{Memory required} &= \text{(bytes per column)} \times \\ &\quad \text{(columns per character)} \times \\ &\quad \text{(number of characters)} \times \\ &\quad \text{(number of fonts)} \\ &= 6 \times 24 \times 3 \times 2 \\ &= 864\text{-bytes} \end{aligned}$$

The amount of memory required to store the fonts of FIGS. 1 and 2 may be decreased or compressed by recognizing that the two fonts share a common character pattern, namely, the "_" character in strip 1 of each font.

Figure 3:
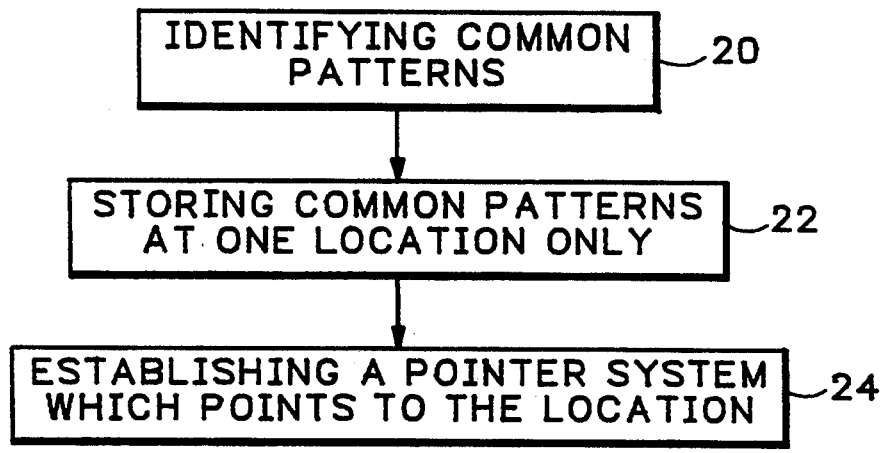
FIG. 3 is a simple block diagram showing how font character data may be compressed according to the invented method.

A common character pattern refers to at least a part of a character that is "common" or shared between two fonts, and is not limited to a bit pattern definition. A common bit pattern refers to at least a part of a character that is described as bits of information and that is shared between fonts. FIG. 3 is a simple block diagram showing how the invented method limits the amount of memory required by recognizing common character patterns. The first step is to recognize or identify common character patterns or bit patterns, as shown in box 20. The common patterns may be stored in memory at one location only, as depicted in box 22, then referenced in each font needing the pattern by an address system or a pointer system which points, ultimately, to the stored common pattern, as represented by box 24. The method recognizes that a printer may have several fonts and that the pointer system may point to a first font, which then points to a second font, and so on until the desired pattern is found.

Figure 4:
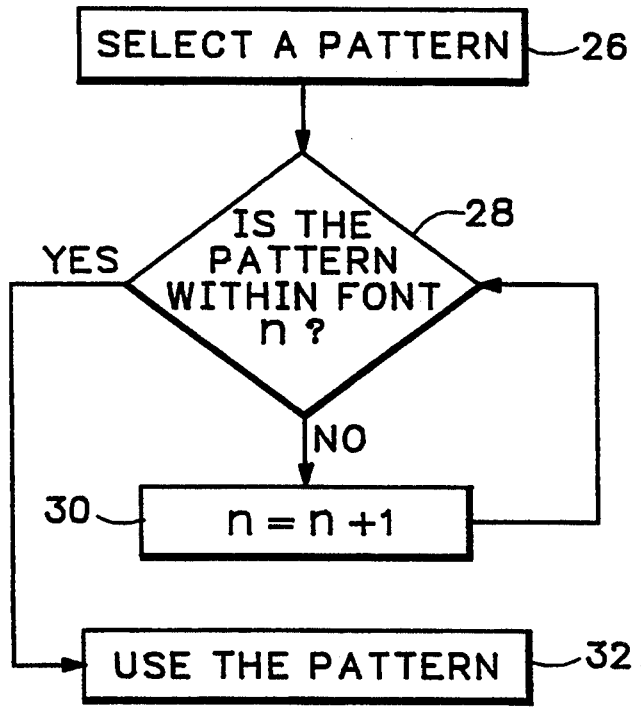
FIG. 4 is a simple block diagram showing how font character data may be decompressed according to the invented method.

FIG. 4 is a block diagram depicting how the compressed fonts of FIGS. 1 and 2 may be decompressed according to the invented method. First, a character or bit pattern is selected at box 26. Then the decompression method determines whether the selected pattern is within a particular font, such as font "n", as illustrated in box 28. If not, the method looks for the bit pattern in another font, such as font "n+1", as illustrated in box 30. The method looks at sequential fonts until the desired pattern is found. When it is found, it may be used, as represented in box 32, by a printer or other device.

FIG. 5 is a storage listing and structure of the font of FIG. 1. The storage listing includes three columns, an address column, a contents column, and a description column. The address specifies the beginning location in memory of the item listed in the description column and may be referred to as a storage address location. The contents column lists the actual data for the item described, and begins with the address listed. The addresses and contents listed in FIG. 5 are hexadecimal numbers. Hereinafter, the addresses in FIG. 5 will be used as line references.

Addresses "0000", "0001" and "0002" contain "Black Width Table" information. That table simply defines the actual width of the characters in the font, so that blank bits do not need to be stored in memory. For example, address "0000" defines the width of the character "1" as "07". In other words, the width of that character is seven bits. When the character is printed, the seven bits will correspond to seven ink dots. As stated earlier when discussing FIG. 1, the possible width of the character is 24-bits. Thus, identifying the width of the "1" means that seventeen blank bit columns do not need to be stored in memory. Similarly, the "i" character is seven bits wide and the "_" is 24-bits wide (in FIG. 5, the width of the "_" character is expressed as 18 hexadecimal, which equals 24 decimal). The resulting font dot patterns are shown in FIG. 6. In FIG. 6, the upright font of FIG. 1 is shown compressed generally at 40, and the italicized font of FIG. 2 is shown compressed generally at 42. In FIG. 6, the dot patterns are expressed in "1s" and "0s", rather than "1s" and "points" to show the actual bit information that would be stored. The "0s" in FIG. 6 correspond to the points in FIGS. 1 and 2. The memory required to store the data shown in FIG. 6 is:

$$\begin{aligned} \text{Memory required} &= \text{((bytes per column)} \times \text{(sum of number} \\ &\quad \text{of columns for all characters))} + \\ &\quad \text{(number of bytes in Black Width} \\ &\quad \text{Table, one per character)} \\ &= (6 \times (7 + 7 + 24 + 10 + 8 + 24)) + \\ &\quad 6 \\ &= 486\text{-bytes} \end{aligned}$$

In FIG. 5, address locations "0003" through "000B" identify the location of the "Flag Byte Pointer Table" for strip 3 of the font depicted in FIG. 1. Flag bytes are bytes of information used to represent other bytes of information. The Flag Byte Pointer Table is a table of data that "points" to the actual flag bytes. By using flag bytes, data defining the characters of FIGS. 1 and 2 can be further compressed. For example, strip 3 of FIG. 1 includes 72-columns of data. Those columns are divided into groups of 24. Specifically, the first 24-columns of strip 3 are used to define the upper portion of the character "1". The second group of 24-columns would be used to define the upper portion of the character "i", if that character was taller. Similarly, the third group of 24-columns would be used to described the "_" character if necessary.

Figure 7:
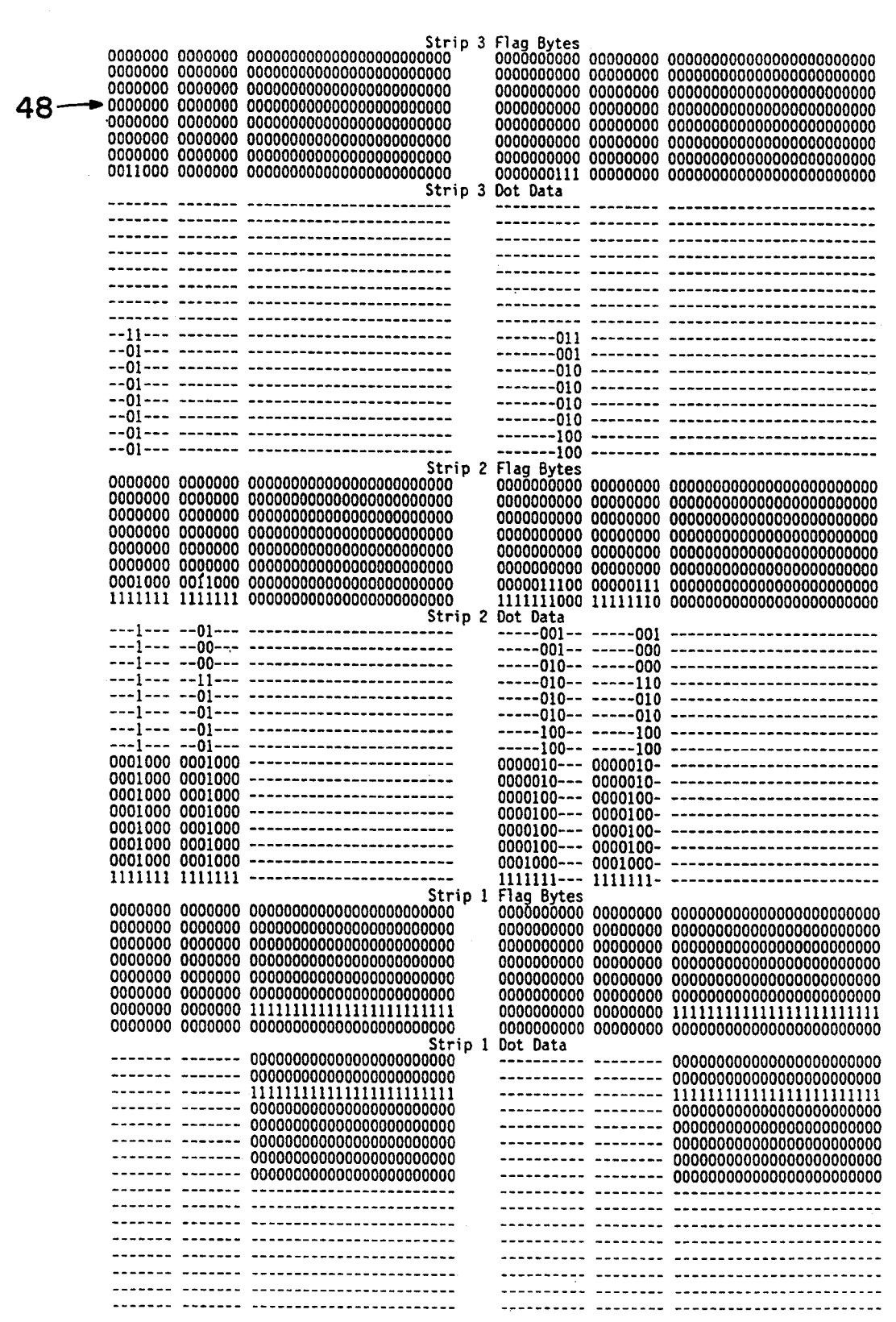

The compression achieved using flag bytes is shown in FIG. 7. FIG. 7 is a dot pattern similar to FIGS. 1 and 6, except that flag bytes have been used to represent blank columns in the strips. In FIG. 7, the font of FIG. 1 is shown generally at 44, and the font of FIG. 2 is shown generally at 46. The flag bytes for strip 3 are shown generally at 48. Each flag byte is a vertically oriented byte of information. The bottom two bits in each flag byte indicate whether the bit column or dot data immediately below it has any bits that are "1" or on. If not, the bit column is not saved, rather it is represented by the flag byte. Each bit of the flag byte corresponds to one byte of the bit column. The flag byte's least significant bit, or bottom bit, represents the bottom byte of the bit column. The flag byte's second bit from the bottom represents the top byte of the bit column. If either of those two flag byte bits are 1, there is dot data in the respective byte of the bit column. In FIG. 7, the top six bits of the flag bytes are not used. If the bit columns in the dot pattern strips were taller, more flag byte bits could be used.

The dashes in FIG. 7 indicate bits of information that do not need to be saved. Some bits with zero values are still saved because typically bits are grouped into bytes, and computing systems often work with bytes.

The memory required to store the data of FIG. 7 is:

```
Memory required = (number of flag bytes) + (strip 3 bytes) +
                  (strip 2 bytes) + (strip 1 bytes) +
                  (number of bytes in Black Width
                  Table) + (number of bytes required
                  for Flag Byte Pointer Tables)
               = ((7 + 7 + 24 + 10 + 8 + 24) × 3) +
                 5 + 37 + 48 + 6 + 48
               = 384-bytes
```

Turning back to FIG. 5, addresses "000D" through "0015" identify the location of the Flag Byte Pointer Table for strip 2, and addresses "0017" through "001F" identify the Flag Byte Pointer Table for strip 1. The actual flag bytes and the dot data for strip 3 is addressed at "0021" through "0031". The flag bytes and dot data for strip 2 are addresses at "0049" through "0068", and the flag bytes and dot data for strip 1 are addressed at "0080" through "00A6".

When character "1" is selected for use, the method determines the width of the character, then each strip is reviewed to see whether it contains a portion of the character. Address location "0005" identifies the information relating to the part of the "1" character in strip 3 as being at "0021". Moving down to address location "0021" lists the flag bytes for the strip 3 portion of the character as "00, 00, 01, 01, 00, 00, 00". There are seven flag bytes because the "1" character is seven bits wide. Again, each flag byte is expressed as a hexadecimal number and represents a vertical column of 16-bits. The first two flag bytes "00" and "00" each represent a vertical column of "00000000 00000000", and they mean that there is no dot data in the first two columns of the character "1" in strip 3. The next two flag bytes "01" and "01" mean that there is dot data in the bottom byte of information in the respective two columns. The flag byte "01" may be expressed in binary as "00000001". The remaining three flag bytes indicate that there is no dot data in strip 3 in those columns for the character. Immediately thereafter, beginning at address location "0028", the actual dot data is stored for the two columns having dot data. The first dot data is listed as "80" in hexadecimal. Converting the hexadecimal "80" to binary equals "10000000". The one represents a dot to be printed by the printer. The entire eight digits represent the bottom eight bits of the appropriate 16-bit column in strip 3. The dot data "FF" in hexadecimal equals "11111111" in binary. That corresponds to the bottom eight bits of the appropriate 16-bit column in strip 3.

The method then moves to address location "000F" to point to the flag bytes in strip 2 that contain a portion of the character "1". The "000F" address points to or contains the "0049" address. The "0049" address contains the flag bytes for the portion of the "1" character in strip 2, immediately followed by the appropriate dot data beginning at address location "0050". The flag bytes and dot data at those locations are similar to the flag bytes and dot data described previously as existing in strip 3.

The same steps are performed to see whether strip 1 contains a portion of the "1" character. Address "0019" points to address "0080". Address location "0080" includes seven flag bytes, each of which is "00". The flag bytes are all zero because no dot data exists in strip 1 for the character.

A similar process would be performed for the characters "i" and "_".

Also in FIG. 5 address locations "000B", "0015", and "001F" identify pointers to virtual characters. The virtual characters are simply the ends of the preceding data. Thus, these pointers, in essence, identify the end of the character portions in the respective strips. By identifying the ends, bidirectional printing may be employed. For example, address location "00BE", described as "Next address" identifies the end of the dot data defining the portion of the "_" character in strip 1.

Address locations "0003", "000D", "0017" are described as "Null Alternate Strip Chain Pointers." That description refers to the pointer system or reference that would identify the location of character or bit patterns stored in another font. Because all three characters of the font shown in FIG. 1 are contained in the storage listing of FIG. 5, the alternate strip chain pointers are null or zero.

FIG. 8 is a font storage listing of the italicized font shown in FIG. 2 and is similar to the listing of FIG. 5. Hereinafter, the addresses in FIG. 8 will be used as line references. FIG. 8 includes a Black Width Table for the characters, Flag Byte Pointer Tables, flag bytes and dot data. However, the font listing of FIG. 8 recognizes that the "_" character of the font shown in FIG. 2 is the same as the "_" character of the font shown in FIG. 1; it is a shared character pattern. Therefore, to save memory and compress the font description, the font listing of FIG. 8 includes "Alternate Strip Chain Pointers" that refer to the font listing of FIG. 5 to define the "_" character. Thus, the "_" character is only stored in memory once.

The method determines when characters or bit patterns are shared by performing a comparison. For example, when the "_" character is selected, address location "1002" defines its width as 18 in hexadecimal. Address location "1009" points to "1036", the address where flag bytes for strip 3 would be located if the "_" character was stored in the listing of FIG. 6. Before reading the flag bytes that would exist at "1036", the method compares the contents of address location "1009" with the contents of the next address location, which is "100B". If the contents are different, then flag bytes exist in the present listing. If the contents of the two addresses are the same, and the character has a width greater than zero, the method in effect, realizes that no flag bytes or dot data is stored for the character in the font listing, and it then uses the alternate strip chain pointer to identify, ultimately, the location of the desired character in another font.

In FIG. 8, the contents of addresses "1009" and "100B" are both "1036", but the width of character "_" is 18. Therefore, the method uses the alternate strip chain pointer to find the data. The alternate strip chain pointer for strip 3 data is at address "1003", and that address points to address "0005". Address "0005" is found in the font storage listing of FIG. 5, and marks the beginning of the flag byte pointer table for strip 3 of the characters of the font shown in FIG. 1. The method would then go through the steps described above to access the data describing the selected character.

FIG. 9, shows the bit information listed in FIG. 8. As can be seen, the "_" character is stored only once, thereby saving memory. The memory required to store the information shown in FIG. 9 is:

```
Memory Required = (number of flag bytes) + (strip 3
                  bytes) + (strip 2 bytes) + (strip 1
```

|  |
| --- |
| bytes) + (number of bytes in Black Width Table) + (number of bytes required for Flag Byte Pointer Tables) + (number of bytes required for Alternate Strip Chain Pointers) <br> = ((7 + 7 + 24 + 10 + 8) × 3) + 5 + 37 + 24 + 6 + 48 + 12 <br> = 300-bytes |

Instead of using one alternate strip chain pointer for each strip, as shown in FIG. 8, a single alternate font pointer may be used for the entire font. If a character or character portion is not stored in a particular font, the alternate font pointer identifies another font that may contain the character. For example, in FIG. 8, the alternate strip chain pointers may be deleted and a single alternate font pointer may be inserted between addresses "1002" and "1003". The alternate font pointer would point to address "0000", which is shown in FIG. 5. The font listing of FIG. 5 could then be reviewed to see if it contains the desired character.

Figure 10:
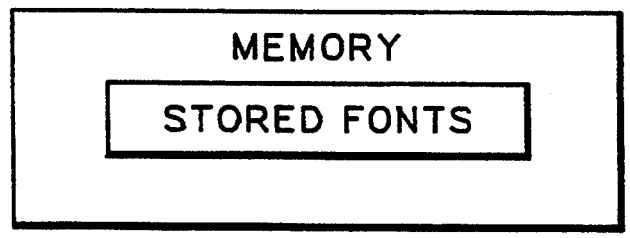
FIG. 10 is a block/schematic diagram showing the invented font structure stored in the memory of an electronic device, such as a printer.

FIG. 10 is a block/schematic diagram showing the above-described method and font structure stored in the memory of an electronic device, such as a printer. The actual stored fonts depicted in FIG. 10 may be similar to the fonts listed in FIGS. 5 and 8.

Figure 11:
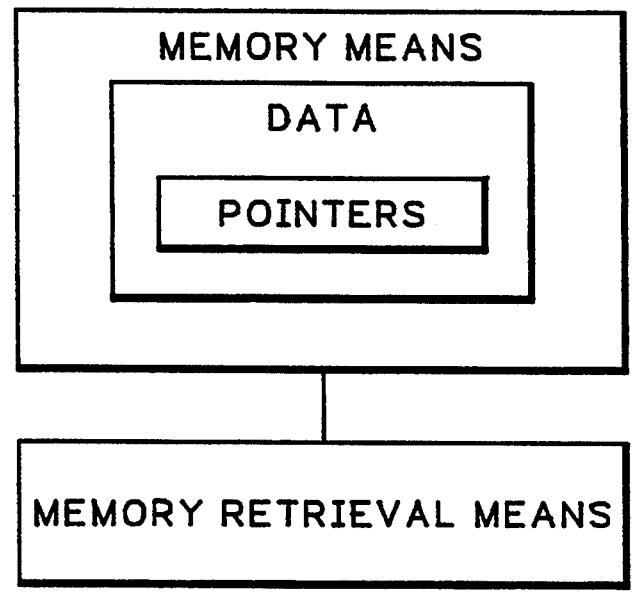
FIG. 11 is a block/schematic diagram of an electronic device employing the invented method and resulting font.

The invented method and font structure will typically be used in electronic devices such as printers. FIG. 11 is a block/schematic diagram of an electronic device employing the invented method and resulting font structure. In such a case, the font structure and associated data will be stored in memory means such as memory chips. Pointers, or pointer means, will be associated with the data for referencing common characters or character parts. The pointers may take the form of the alternate strip chain pointers or alternate font pointers described previously. Additionally, the electronic device will include memory retrieval means, such as disk drives and read/write heads, for accessing the font structure and associated data.

INDUSTRIAL APPLICABILITY

The invented method, device and resulting font structure are applicable to situations where multiple fonts are to be saved in limited memory, such as in computer printers. The fonts of FIGS. 1 and 2 share the "_" character, and FIGS. 5 and 8 show font listings that depict how the invented method may be used to compress those fonts. The invention may also be used where only a portion of a character is shared between fonts, for example, if the portion of the "1" character in strip 3 was the same in two fonts, the method could be used.

While the best mode and preferred embodiment of the invention have been described, variations and changes may be made without departing from the spirit of the invention.

What is claimed is:

1. A computerized method of compressing a plurality of fonts for space-saving storage in a memory device connected with an electronic printer controller, where each font includes a set of characters and where at least one character is common to more than one font, the method comprising:

recognizing the characters that are common to more than one font;

retaining in a memory device one copy of each character that is common to more than one font and omitting the remaining copies from the memory device;

creating pointers in the memory device both to replace the omitted copies of characters that are common to more than one font and to identify the retained copies of characters;

combining the characters from each font that are not common to more than one font with the respective pointers that replaced the omitted copies of characters from each font; and storing the combined characters and pointers in the memory device.

2. The method of claim 1 where each character is divided into portions, at least one character portion is common to more than one font, the step of recognizing recognizes the character portions that are common to more than one font, the step of retaining retains one copy of each character portion that is common to more than one font and omitting the remaining copies, the step of creating creates pointers both to replace the omitted copies of character portions that are common to more than one font and identifies the retained copies of character portions, and where the step of combining combines the characters and the character portions from each font that are not common to more than one font with the respective pointers replacing the omitting copies of character portions from each font.

3. The method of claim 1 where the retained copies of characters are defined by data stored in a memory device at predetermined address locations, and where the pointers comprise data, also stored at predetermined address locations in the memory device, which identifies the address locations of the retained copies of characters.

4. The method of claim 1 where the retained copies of characters are defined by data stored in a memory device at predetermined sequential address locations, and where the pointers comprise data, also stored at predetermined address locations in the memory device, which identifies the beginning address location of the retained copies of characters.

5. The method of claim 1 where the characters of a first font are defined by data stored in a memory device at predetermined address locations, the first font includes, within the data stored in the memory device at the predetermined address locations, at least one retained copy of a character common to more than one font, and where at least one pointer comprises data, also stored in the memory device at predetermined address locations, which identifies the beginning address location of the first font.

6. The method of claim 1 comprising at least three fonts, where the characters of the three fonts are defined by data stored in a memory device at predetermined address locations, and where at least one pointer identifies at least one retained copy of a character by pointing to a second pointer which, in turn, identifies the address locations of the data defining the retained copy of a character.

7. A method of printing characters from a plurality of fonts, where each character is defined by data stored in memory accessible by a printer, at least a portion of the data defining one character is common to more than one font, the portions of data common to more than one font are retained in only one, but not necessarily the same, font at predetermined locations in the memory device, where the data defining each character is stored sequentially in the memory and indexed by a table of sequential memory addresses which contain information identifying the beginning address of the data defining each character, and where the fonts that include the portions of data common to more than one font, but that do not include the retained portions, include pointers both to identify the predetermined locations in the memory device where the data portions are retained and to replace the data portions common to more than one font, the method comprising:

- selecting the font;
- identifying a character from the selected font to be printed;
- determining if the data defining the character to be printed is retained in the selected font;
- if so, retrieving the data and printing the character; but
- if not, reading the pointer replacing the data in the selected font, retrieving the data from the locations identified by the pointer and printing the character; and
- repeating the steps listed above until all the characters to be printed have been printed, where the step of determining if the data defining the character to be printed is retained in the selected font includes:

- recognizing the memory address in the table of memory addresses that indexes the data defining the character to be printed;
- comparing the contents of the memory address that indexes the data defining the character to be printed with the next sequential memory address in the table of memory addresses; and
- if there is no difference between the contents of the memory address that indexes the data defining the character to be printed and the next sequential memory address in the table of memory addresses, then concluding that the data defining the character to be printed is not retained in the selected font; but
- if there is a difference between the contents of the memory address that indexes the data defining the character to be printed and the next sequential memory address in the table of memory addresses, then concluding that the data defining the character to be printed is retained in the selected font.

8. A font compilation in a memory device, the compilation comprising:

- a first font having a plurality of characters defined by data stored in the memory device;
- a second font having a plurality of characters also defined by data stored in the memory device;
- at least one pointer in the second font identifying data that defines a portion of a character in the first font, where the data identified by the pointer also defines a portion of a character in the second font, the two character portions being common to the first and second fonts and being shared thereby, but where the shared character portion-defining data identified by the pointer is only stored once in the memory device.

* * * * *